US008664912B2

(12) United States Patent
Olsberg

(10) Patent No.: US 8,664,912 B2
(45) Date of Patent: Mar. 4, 2014

(54) LOW BATTERY VOLTAGE ALERT SYSTEM

(75) Inventor: Alan Olsberg, Schaumburg, IL (US)

(73) Assignee: Old World Industries, Inc., Northbrook, IL (US)

( * ) Notice: Subject to any disclaimer, the term of this patent is extended or adjusted under 35 U.S.C. 154(b) by 139 days.

(21) Appl. No.: 12/710,879

(22) Filed: Feb. 23, 2010

(65) Prior Publication Data

US 2010/0244766 A1    Sep. 30, 2010

(51) Int. Cl.
*H02J 7/14*    (2006.01)
(52) U.S. Cl.
USPC ............ 320/105; 320/103; 320/104; 320/162
(58) Field of Classification Search
USPC ....................................................... 320/105
See application file for complete search history.

(56) References Cited

U.S. PATENT DOCUMENTS

| | | | | |
|---|---|---|---|---|
| 3,598,935 | A * | 8/1971 | Nava et al. ................... | 200/17 R |
| 5,791,183 | A | 8/1998 | Spiegelberg | |
| 6,057,667 | A | 5/2000 | Mills | |
| 6,060,861 | A | 5/2000 | Feng | |
| 6,201,370 | B1 | 3/2001 | Reller et al. | |
| 6,222,342 | B1 | 4/2001 | Eggert et al. | |
| 6,252,378 | B1 | 6/2001 | Crass et al. | |
| 6,344,733 | B1 * | 2/2002 | Crass et al. ................... | 320/143 |
| 6,380,712 | B2 | 4/2002 | Murphy | |
| 6,650,086 | B1 | 11/2003 | Chang | |
| 7,199,555 | B2 * | 4/2007 | Hung ............................ | 320/114 |
| 8,084,989 | B2 * | 12/2011 | Liu ............................... | 320/105 |
| 2001/0035733 | A1 * | 11/2001 | Murphy et al. ............... | 320/107 |
| 2004/0130298 | A1 | 7/2004 | Krieger | |
| 2005/0110467 | A1 | 5/2005 | Thompson | |
| 2007/0278990 | A1 | 12/2007 | Raichle et al. | |
| 2007/0285053 | A1 * | 12/2007 | Noguchi et al. .............. | 320/114 |

OTHER PUBLICATIONS

Patent Cooperation Treaty, International Searching Authority, Notification of Transmittal of the International Search Report and the Written Opinion of the International Searching Authority, or the Declaration, in International application No. PCT/US11/25806, dated Apr. 19, 2011.

(Continued)

*Primary Examiner* — Edward Tso
*Assistant Examiner* — Johali Torres Ruiz
(74) *Attorney, Agent, or Firm* — McAndrews, Held & Malloy, Ltd.

(57) ABSTRACT

Certain embodiments of the present invention provide a system for alerting a low battery charge condition in a jump-starter. In an embodiment, the system is portable. The system includes a first battery. The first battery is configured to provide a first battery voltage across a positive terminal and a negative terminal of the first battery. The system also includes a voltage comparison circuit that is electrically connected to the positive terminal and the negative terminal of the first battery. The voltage comparison circuit is configured to compare a reference voltage to the first battery voltage. The system includes an alert circuit electrically connected to the voltage comparison circuit and configured to generate an output signal for a speaker. The system also includes a switch configured to toggle between an enabled state and a disabled state. In an embodiment, the switch includes a stopper tap. The alert circuit is configured to cause an audible alert when the first battery voltage is less than the reference voltage, and when the enabled state is true. When the enabled state is false (or the disabled state is true), the alert circuit will not cause the audible alert. In an embodiment, the system includes a display circuit to visually indicate the first battery voltage.

6 Claims, 4 Drawing Sheets

(56) References Cited

OTHER PUBLICATIONS

Bolder Technologies Pte Ltd Co., SecureStart Mini Max 900 (SS103A), 2005.
Bolder Technologies Pte Ltd, SecureStart Mini Max 900, Portable Jump Starter with Fuel-Gauge Indicator, SS103A User's Manual, pp. 1-5, 2005.
Bolder Technologies Pte Ltd, SecureStart Portable Jump Starter Breakthrough TMF Battery Technology, SS103A, 1999.
Bolder Technologies Pte Ltd, SecureSound F600, Frequently Asked Questions, 2005.
PR Newswire, Bolder Technogies Completes Agreements with Sears, Roebuck & Co., Aug. 19, 1999.
PCT, Notification Concerning Transmittal of International Preliminary Report on Patentability, in International application No. PCT/US2011/025806, dated Sep. 7, 2012.
Mexican Patent Office, Office action in Application No. MX/a/2012/009715, dated Sep. 3, 2013.

* cited by examiner

US 8,664,912 B2

LOW BATTERY VOLTAGE ALERT SYSTEM

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present invention relate generally to alerts when a battery has low voltage. More specifically, some embodiments of the present invention relate to portable vehicle jump-starters that provide audible alerts if the jump-starter battery loses charge.

Vehicle batteries, such as lead-acid batteries, may lose charge as a result of electrical loading or leakage over a period of time. A battery with a relatively low charge may not be effective for driving the electrical systems of a vehicle. In order to boost the charge of a vehicle battery, devices such as jump-starters are available.

A jump-starter, such as a portable jump-starter, may have an internal battery that can be connected in parallel with a vehicle battery to recharge the vehicle battery. Like the vehicle battery, the jump-starter battery may be a lead-acid battery, and may also lose charge as a result of electrical loading or leakage over a period of time. If the jump-starter battery lacks sufficient charge, it may not be effective when trying to recharge another battery, such as a vehicle battery.

It may be helpful, therefore, to provide systems and methods for alerting that a jump-starter battery lacks sufficient charge to recharge another battery.

BRIEF SUMMARY OF THE INVENTION

Certain embodiments of the present invention provide a system for alerting a low battery charge condition in a jump-starter. In an embodiment, the system is portable. The system includes rechargeable lead-acid first battery. The first battery is configured to provide a first battery voltage across a positive terminal and a negative terminal of the first battery. The system also includes a voltage comparison circuit that is electrically connected to the positive terminal and the negative terminal of the first battery. The voltage comparison circuit is configured to compare a reference voltage to the first battery voltage. In an embodiment, the reference voltage is substantially 10.5 Volts. The system includes an alert circuit electrically connected to the voltage comparison circuit and configured to generate an output signal for a speaker. The system also includes a switch configured to toggle between an enabled state and a disabled state. In an embodiment, the switch includes a stopper tap. In a further embodiment, the stopper tap includes a male portion configured to be inserted into a jack. The alert circuit is configured to cause an audible alert when the first battery voltage is less than the reference voltage, and when the enabled state is true. When the enabled state is false (or the disabled state is true), the alert circuit will not cause the audible alert. In an embodiment, the system includes a display circuit to visually indicate the first battery voltage.

In an embodiment, the system further includes a pair of connectors configured to connect to a second battery. The second battery is a rechargeable lead-acid battery with a positive terminal and a negative terminal. The pair of connectors includes a positive connector for electrically connecting the positive terminal of the first battery with the positive terminal of the second battery. The pair of connectors also includes a negative connector for electrically connecting the negative terminal of the first battery with the negative terminal of the second battery. In this embodiment, the first battery is capable of recharging the second battery when the positive terminal of the first battery is electrically connected to the positive terminal of the second battery, and when the negative terminal of the first battery is electrically connected to the negative terminal of the second battery.

Certain embodiments of the present invention provide a method for detecting a low battery charge condition. The method includes a step of toggling with a switch to enable an audible alert and to disable the audible alert. The method further includes a step of measuring a first battery voltage, which is the difference between the voltages of a positive and negative terminal of a first lead-acid rechargeable battery. The method further includes a step of establishing a reference voltage. In an embodiment, the reference voltage is substantially 10.5 Volts. The method further includes a step of comparing the first battery voltage to the reference voltage. The method also includes steps of determining if the first battery voltage is less than the reference voltage, and generating the audible alert when the first battery voltage is less than the reference voltage, and when the switch is toggled to enable the audible alert. In an embodiment, the switch includes a stopper tap. In a further embodiment, the stopper tap includes male portion configured to be inserted into a jack. In another embodiment, the method includes a step of displaying a visual indicator corresponding to the first battery voltage.

In an embodiment, the method includes steps of electrically connecting a positive connector between the positive terminal of the first lead-acid rechargeable battery and a positive terminal of a second lead-acid rechargeable battery, electrically connecting a negative connector between the negative terminal of the first lead-acid rechargeable battery, and a negative terminal of the second lead-acid rechargeable battery, and recharging the second lead-acid rechargeable battery.

In another embodiment, the method includes steps of providing a system that performs the previously mentioned steps, and shipping the system with the switch toggled to disable the audible alert.

Certain embodiments of the present invention provide a system for communicating a low battery charge condition. The system includes a means for toggling with a switch to enable an audible alert and to disable the audible alert. The system further includes a means for measuring a first battery voltage, which is the difference between the voltages of a positive and negative terminal of a first lead-acid rechargeable battery. The system further includes a means for of establishing a reference voltage. In an embodiment, the reference voltage is substantially 10.5 Volts. The system further includes a means for comparing the first battery voltage to the reference voltage. The system also includes a means for determining if the first battery voltage is less than the reference voltage, and a means for generating the audible alert when the first battery voltage is less than the reference voltage, and when the switch is toggled to enable the audible alert. In an embodiment, the switch includes a stopper tap. In a further embodiment, the stopper tap includes male portion configured to be inserted into a jack. In another embodiment, the system includes a means for displaying a visual indicator corresponding to the first battery voltage.

In an embodiment, the system includes a means for of electrically connecting a positive connector between the positive terminal of the first lead-acid rechargeable battery and a positive terminal of a second lead-acid rechargeable battery, a means for electrically connecting a negative connector between the negative terminal of the first lead-acid rechargeable battery, and a negative terminal of the second lead-acid rechargeable battery, and a means for recharging the second battery.

Figure 1:
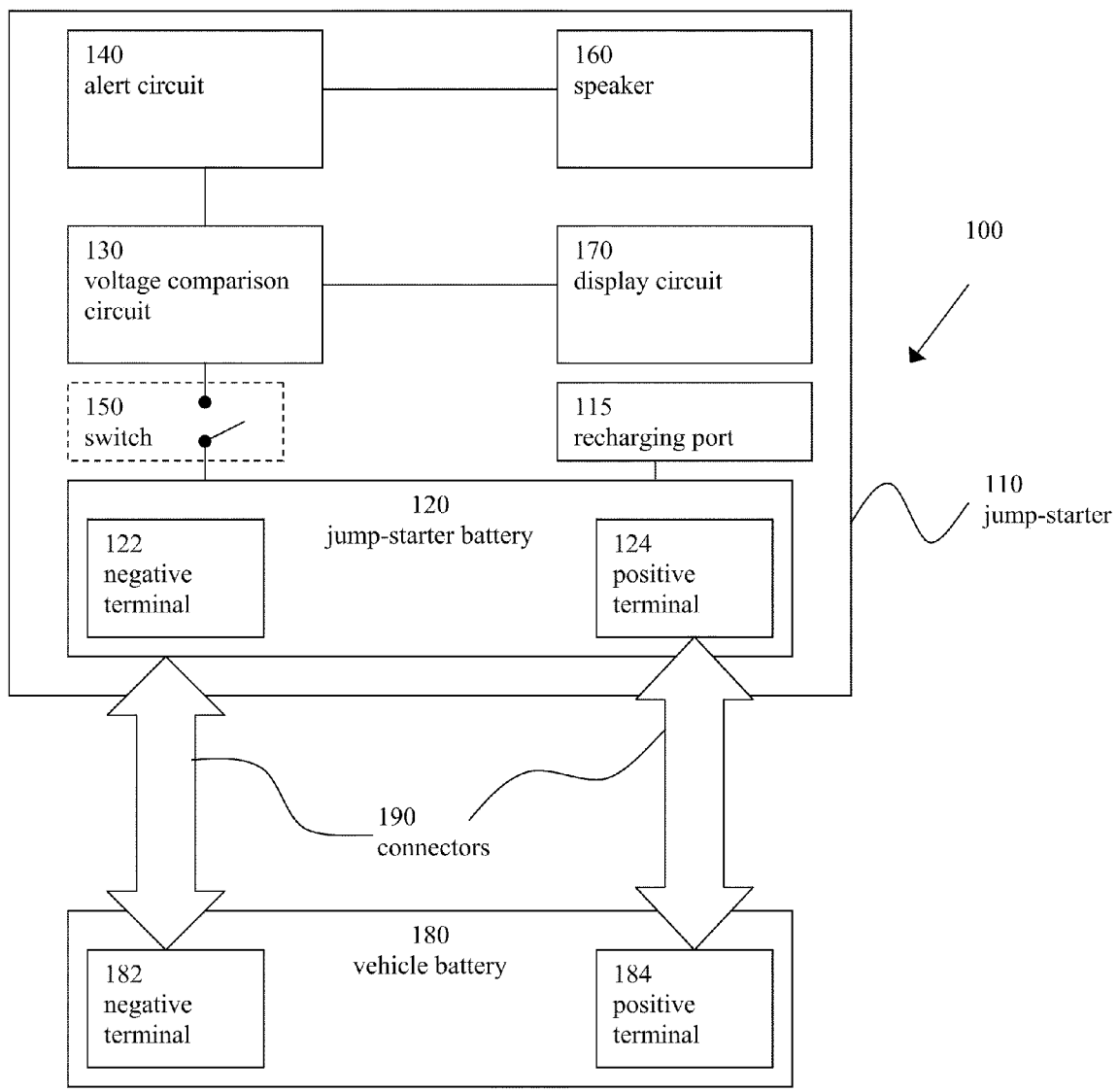
FIG. 1 shows a block diagram of a system for jump-starting a vehicle battery, in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentalities shown in the drawings.

DETAILED DESCRIPTION OF THE INVENTION

FIG. 1 shows a block diagram 100 of a system for jump-starting a vehicle battery, in accordance with an embodiment of the present invention. System 100 may include a jump-starter 110, which may further include a jump-starter battery 120 with a negative terminal 122 and a positive terminal 124, a voltage comparison circuit 130, an alert circuit 140, a speaker 160, a switch 150, a display circuit 170, a recharging port 115, and a pair of connectors 190. The jump-starter 110 may be capable of powering its circuits from the jump-starter battery 120, or through energy that arrives via the recharging port 115. The jump-starter 110 may be portable. The jump-starter 110 may have a handle that facilitates a person to transport the jump-starter 110, for example, into a trunk or a storage area of a vehicle. Also, the system may include a vehicle battery 180 with a negative terminal 182 and a positive terminal 184. The vehicle battery 180 may not be part of the jump-starter 110, but is illustrated in FIG. 1 to illustrate the overall operation of the system 100 according to an embodiment of the present invention. Other configurations of the components of system 100 may also be possible. Further, the various system components may be logically or physically combined or overlapping. For example, the different circuits may be part of one or more conceptually larger circuits and/or may share electrical elements.

The jump-starter battery 120 may be a lead-acid battery that is rechargeable. The jump-starter battery 120 may be included within a casing of the jump-starter 110, or may be external to the casing. The jump-starter battery 120 may be rechargeable through the recharging port 115. The recharging port 115 may accept an input, such as an AC or a DC voltage. The recharging voltage may be converted into a different voltage (for example, an AC voltage may be converted into a suitable DC voltage) that is used to recharge the jump-starter battery 120. The energy used to recharge the jump-starter battery 120 may come from an electrical outlet or from another battery, for example. The jump-starter battery 120 may also be recharged through the pair of connectors 190. The jump-starter battery 120 may be similar to the vehicle battery 180, and may be replaceable. Both the jump-starter battery 120 and the vehicle battery 180 generate voltages across their respective positive and negative terminals. A battery voltage may be related to the amount of energy or charge that a given battery is storing. Therefore, the battery voltage may be used to estimate how much charge is in the battery.

A voltage comparison circuit 130 may be implemented to compare a reference voltage to the voltage of the jump-starter battery 120. The reference voltage may be established through a zener diode or other suitable voltage reference. The reference voltage may be established as a ratio or a proportion of the voltage reference. The reference voltage may then be compared to the jump-starter battery 120 voltage, for example, through a comparator. If the jump-starter battery 120 voltage is less than the reference voltage, then a signal may be sent to the alert circuit 140 to indicate that an audible alert should be generated. The reference voltage may be, for example, 10.5 Volts and may have a suitable tolerance such as ±0.5 Volts. The alert circuit 140 may, in turn, generate a signal that is sent to the speaker 160.

The speaker 160 may be suitable for generating sounds that audibly alert a user. The speaker 160 may be capable of generating a sound that is sufficiently loud and/or distinctive to be noticed. For example, if a jump-starter is located in the trunk of a vehicle, the speaker 160 may be capable of alerting the driver of the vehicle. The speaker 160 may include an amplifier, or the amplifier may be in the alert circuit 140. The speaker 160 may also include a transducer, for example, such as a speaker cone, a piezoelectric buzzer, or other types of devices that can convert electrical energy into acoustic energy.

The switch 150 may be, or include various types of switching devices. For example, a switch 150 may include a toggle switch, a push button switch, a momentary contact switch, a throw switch, a one-time switch, and/or the like. The switch 150 may be toggled through a user interaction, or may be automatically toggled. In one embodiment, the switch 150 may be a stopper tap. A stopper tap may include a male portion configured to be inserted into a jack. The male portion may include a variety of different shapes, such as a cylinder, a rectangular solid, or the like. The stopper tap may include a push pin having a variety of different head shapes, such as different geometrical shapes. The switch 150 may also provide visual, audible, and/or tactile feedback to indicate to the user that the switch 150 has been toggled.

The switch 150 may cause an enabled or disabled state, or cause an enabled state to be true/false or a disabled state to be true/false. For example, as shown in FIG. 1, the switch 150 is configured between the jump-starter battery 120 and the voltage comparison circuit 130. In this configuration, when the switch 150 is off, a signal flow to the voltage comparison circuit 130 is interrupted. Other configurations are possible. For example, the switch 150 may be located between the voltage comparison circuit 130 and the alert circuit 150. The switch 150 may also be located between the alert circuit 140 and the speaker 160. In these configurations the switch 150 may cause the enabled state to be true when the switch 150 is closed. Similarly, the switch 150 may cause the disabled state to be true when the switch 150 is open.

Additionally, the switch 150 may be implemented as a separate input to one or more circuits. For example, the switch 150 may be implemented as an input to the alert circuit 140. To further illustrate this example, the input from the switch 150 may be similar to an enable signal. As another option, the switch 150 may be implemented as an input to the voltage comparison circuit 130 (for example, as an enable signal). Other configurations may also be possible, such as an enabling input to the speaker 160. In such configurations, the effect may be to cause the enabled or disabled states by enabling or disabling one or more circuits in the signal path. When the switch 150 is configured to be implemented as a separate input (for example, as an enable/disable signal), the input may be evaluated, for example, as a logical signal to determine whether a circuit will be enabled or disabled. Enabling or disabling may also result from applying or removing power to one or more circuits, or portions thereof. Therefore, the switch 150 may operate to toggle between the enabled and disabled states by interrupting the signal flow between the circuits and/or enabling or disabling one or more circuits, or portions thereof.

The display circuit 170 may be capable of visually indicating the voltage of the jump-starter battery 120. The display circuit 170 may have one or more of various light sources, such as LEDs, OLEDs, LCDs, incandescent lights, etc. The display circuit 170 may indicate the voltage of the jump-starter battery 120 at one or more different resolutions. For example, using an LCD it may be possible to indicate the voltage to a tenth of a volt or less. As another example, using only one LED it may be possible to visually indicate whether the battery is higher or lower than a specified voltage. The display circuit 170 may obtain the voltage from the jump-starter battery 120, and/or may receive an output from a circuit, such as voltage comparison circuit 130.

Figure 3:
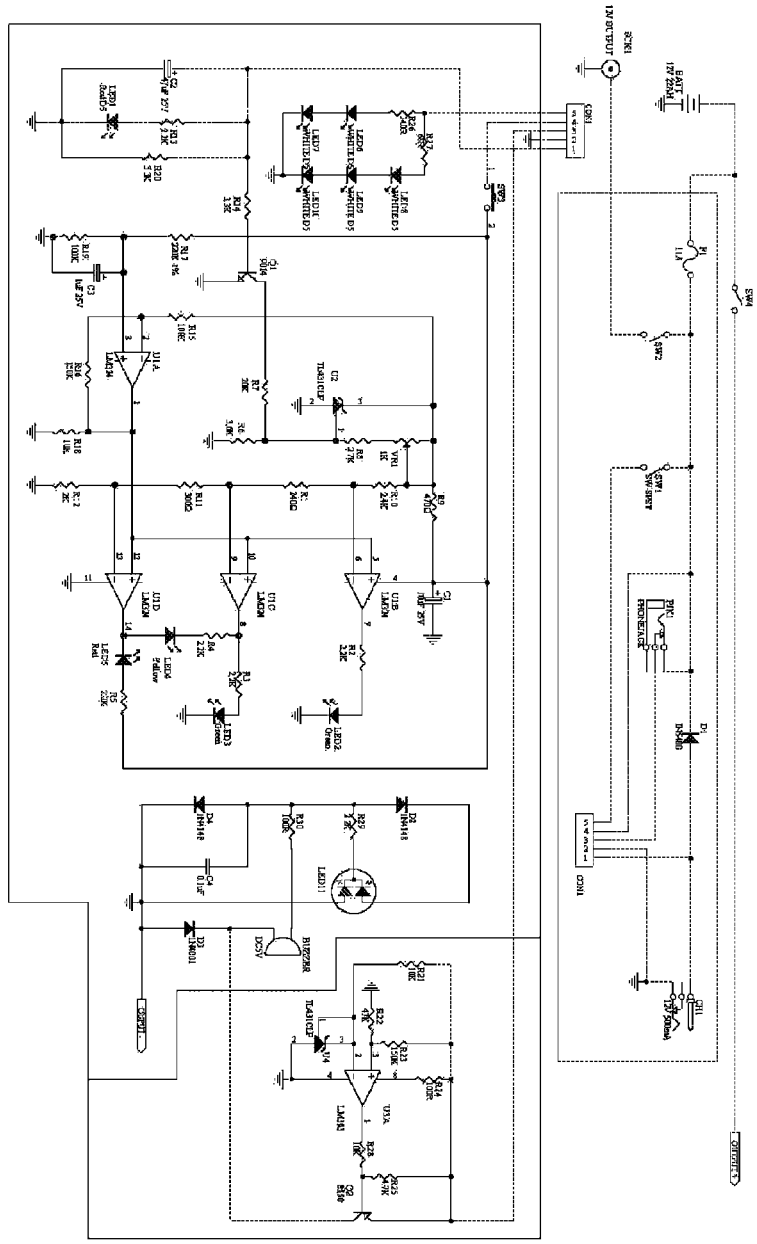
FIG. 3 shows an electrical schematic for implementing a jump-starter, in accordance with an embodiment of the present invention.

FIG. 3 shows an electrical schematic for implementing a jump-starter, in accordance with an embodiment of the present invention. The electrical schematic may be reflective of all or a portion of system 100. The circuitry in FIG. 3 may also be implemented (at least partially) with a microprocessor or through an application specific integrated circuit. The jump-starter battery BATT is connected through SW4 to recharge a vehicle battery through OUTPUT+ and OUTPUT−. A recharging port SCK1 is configured to supply 12 VDC power through SW2 to the power bus, to recharge BATT and/or to power the electronics. The voltage of BATT is visually indicated by LED2-LED5 when SW3 is closed.

A comparator U3A and BUZZER are enabled and disabled through switch PJK1. When the switch PJK1 is closed, the voltage of BATT is compared to a reference voltage through comparator U3A and associated components. It may be understood that the comparator U3A compares a ratio of the BATT voltage to a voltage across U4. However, the effect of the comparison circuit is to compare the BATT voltage to a reference voltage, which is proportional to the voltage across U4.

If the BATT voltage is less than the reference voltage established by U4 (in this case, the reference voltage is proportional to a voltage across U4), then BUZZER is actuated and causes an audible alert. The audible alert signifies to a user (for example, the driver of a vehicle) that BATT should be recharged. A visual alert is also provided through LED11 along with the audible alert. Therefore, through the operation of the circuitry shown in FIG. 3, an audible alert and a visual alert are provided when the switch PJK1 is closed, and when the BATT voltage is less than a reference voltage (which is proportional to the voltage across U4).

Figure 4:
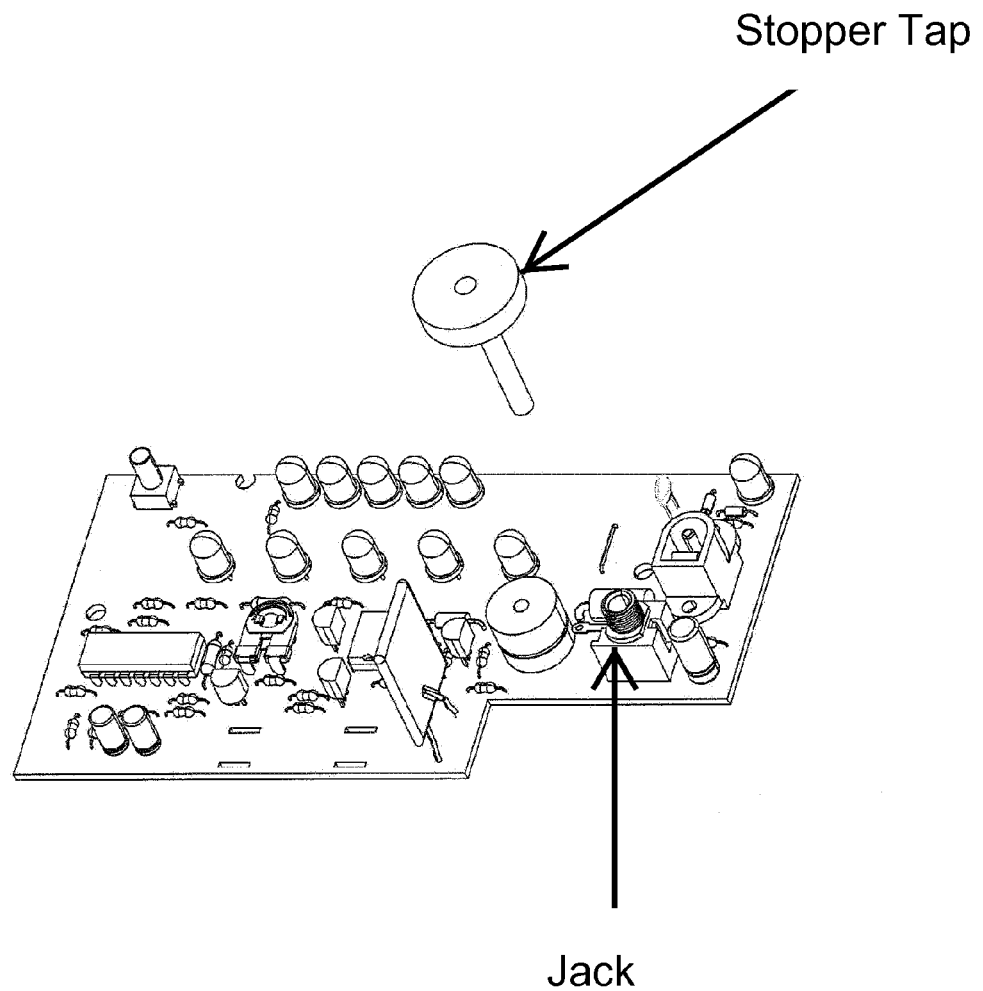
FIG. 4 shows a mechanical drawing for implementing a jump-starter, in accordance with an embodiment of the present invention.

FIG. 4 shows a mechanical drawing for implementing a jump-starter, in accordance with an embodiment of the present invention. Various system components are shown, including LEDs, a buzzer, a recharging port, and a stopper tap switch mounted on a circuit board. FIG. 4 may be reflective of the schematic of FIG. 3 in one or more aspects.

Figure 2:
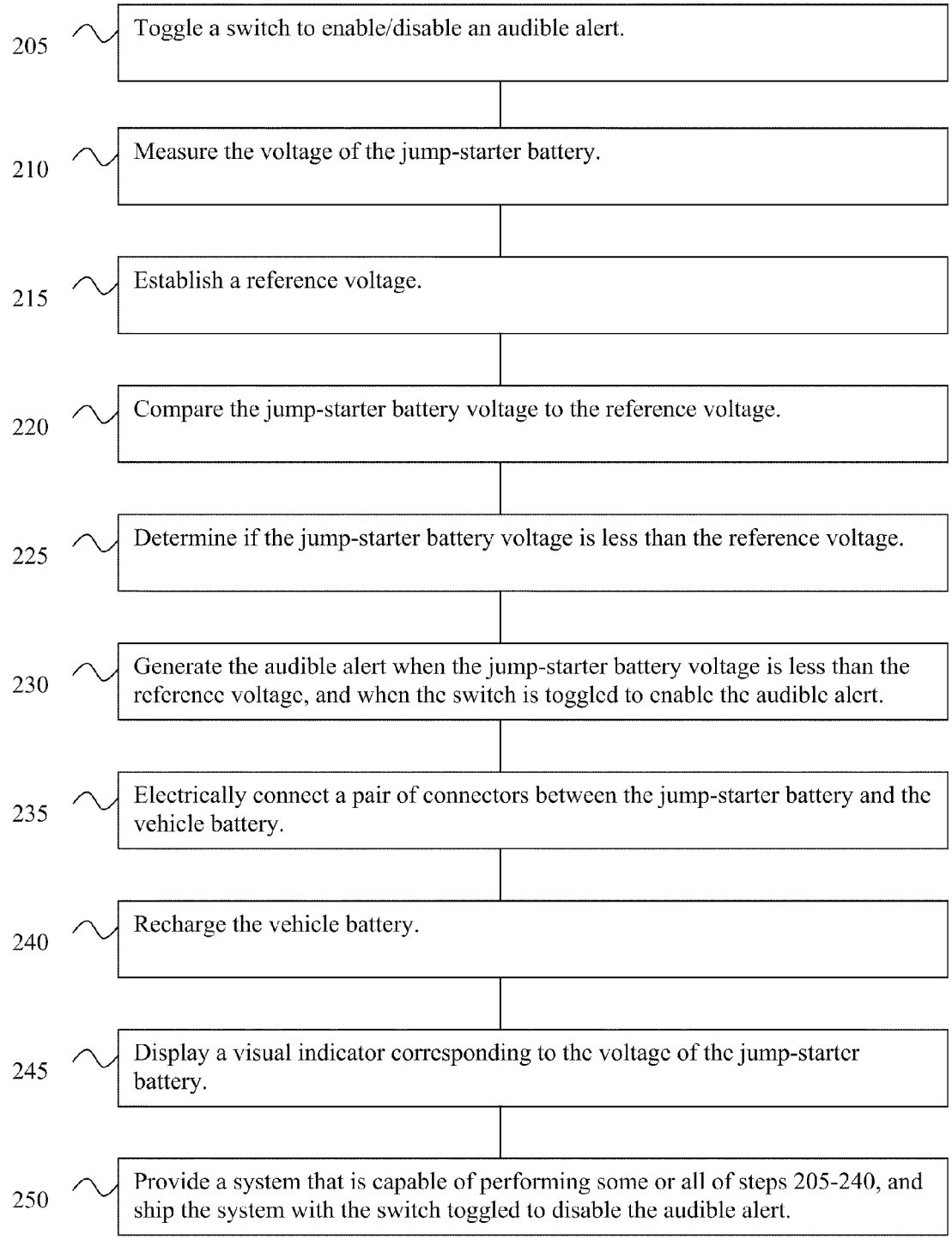
FIG. 2 shows a flow chart of a method for jump-starting a vehicle battery, in accordance with an embodiment of the present invention.

FIG. 2 shows a flow chart 200 of a method for jump-starting a vehicle battery, in accordance with an embodiment of the present invention. The steps of the flow chart 200 may be performable, for example, by a system such as system 100 (or a portion thereof). Furthermore, the steps of method 200 may be performable in a different order, or some steps may be omitted, or some steps may be performed in parallel according to design preferences. For example, step 245 may be performed before step 205, or step 245 may be performed in parallel with step 240. Method 200, or a portion thereof, may be performable by one or more processing units. Method 200, or a portion thereof, may be performable by software, hardware, and/or firmware. Method 200, or a portion thereof, may also be expressible through a set of instructions stored on one of more computer-readable storage media, such as RAM, ROM, EPROM, EEPROM, optical disk, magnetic disk, magnetic tape, and/or the like.

At step 205, a switch may be toggled to enable or disable an audible alert. As discussed, the audible alert may be enabled or disabled through various possible configurations and styles of the switch. The switch 150 may toggle to enable or disable the audible alert by opening or closing one or more connections.

At step 210, a voltage of a jump-starter battery may be measured. For example, the voltage of the jump-starter battery may be measured by a voltage comparison circuit. At step 215, a reference voltage may be established. The reference voltage may be established by a voltage reference (for example a zener diode) or may be established as a proportion or ratio of a voltage reference. At step 220, the voltage of the jump-starter battery and the reference voltage may be compared. For example, the comparison may be performed by the voltage comparison circuit. At step 225, it may be determined whether the jump-starter battery voltage is less than the reference voltage. The determination may be performed by the voltage comparison circuit. At step 230, if the jump-starter battery voltage is less than the reference voltage, and if the switch is toggled to enable the audible alert, then an audible alert may be generated. The audible alert may be generated by an alert circuit in conjunction with a speaker, in accordance with these conditions.

At step 235, a pair of connectors may be electrically connected between the jump-starter battery and a vehicle battery. At step 240, the vehicle battery may be recharged when the connectors are connected.

At step 245, a visual indicator corresponding to the voltage of the jump-starter battery may be displayed. The visual indicator may be displayed by a display circuit. The visual indicator may operate whether or not there is a potential alert condition. The visual indicator (either the same or a different visual indicator) may also operate to provide a visual alert in conjunction with the audible alert. At step 250, a system may be provided that is capable of performing steps 205-240, and the system may be shipped with the switch toggled to disable the audible alert during the shipping process.

To illustrate an example, the flow chart 200 may be implemented in the following manner. At step 205, a switch is toggled to enable an audible alert. At step 210, a jump-starter battery voltage is measured to be 10.3 Volts by a voltage comparison circuit. At step 215, a reference voltage of 10.5 Volts is established by the voltage comparison circuit 130. The reference voltage of 10.5 Volts is proportional to a voltage across a zener diode in the voltage comparison circuit. The reference voltage also has an associated tolerance of ±0.5

Volts. At steps 220 and 225, the voltage comparison circuit then compares and determines that the jump-starter battery voltage of 9.8 Volts is less than the reference voltage of 10.5 Volts and outside the tolerance of ±0.5 Volts. At step 230, an audible alert is generated by an alert circuit and a speaker. Looping back to step 205, the switch is toggled to disable the audible alert. The voltage comparison circuit and the alert circuit are, as a result, disabled. Therefore, the audible alert will cease.

Thus, embodiments of the present invention provide for systems and methods for alerting that a jump-starter battery lacks sufficient charge to recharge another battery.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, features may be implemented with software, hardware, or a mix thereof. Therefore, it is intended that the invention not be limited to the particular embodiment disclosed, but that the invention will include all embodiments falling within the scope of the appended claims.

The invention claimed is:

1. A system for alerting a low battery charge condition in a jump-starter, the system comprising:
   a first battery comprising a rechargeable lead-acid battery, a positive terminal, and a negative terminal, wherein the first battery is configured to provide a first battery voltage across the positive terminal and the negative terminal;
   an audible alert circuit electrically connected to the positive and negative terminals of the first battery, wherein the circuit is configured to:
      compare a reference voltage to the first battery voltage, and
      generate an audible alert when the first battery voltage is less than the reference voltage when the circuit is operative,
      not generate an audible alert when the circuit is inoperative,
   a display circuit configured to:
      visually indicate the first battery voltage when the display is operative, and
      not visually indicate the first battery voltage when the display is inoperative;
   a pair of connectors configured to form a corresponding pair of electrical connections between the first battery and a second battery;
   a first switch configured to toggle between:
      an ON state to maintain at least one of the pair of electrical connections between the first battery and the second battery, and
      an OFF state to interrupt at least one of the pair of electrical connections between the first battery and the second battery,
   a second switch configured to toggle between an audible alert enabled state and an audible alert disabled state through a user interaction; and
   wherein:
      when the first switch is in the ON state and the second switch is in the audible alert disabled state, the audible alert circuit is inoperative,
      when the first switch is in the ON state and the second switch is in the audible alert enabled state, the audible alert circuit is operative,
      when the first switch is in the OFF state and the second switch is in the audible alert enabled state, the audible alert circuit is operative, and
      when the first switch is in the OFF state and the second switch is in the audible alert disabled state, the audible alert circuit is inoperative.

2. The system of claim 1, wherein the second switch comprises a stopper tap.

3. The system of claim 2, wherein the stopper tap comprises male portion configured to be inserted into a jack.

4. The system of claim 1, wherein the reference voltage comprises substantially 10.5 Volts.

5. The system of claim 1, wherein the system is portable.

6. The system of claim 1, further comprising:
   a third switch configured to toggle between a display enabled state and a display disabled state; and
   wherein:
      when the first switch is in the OFF state and the third switch is in the display disabled state, the display circuit is inoperative,
      when the first switch is in the OFF state and the third switch is in the display enabled state, the display circuit is operative.

* * * * *